Dec. 10, 1929.  P. PASCALE  1,739,015
VALVE
Filed Aug. 28, 1926

Inventor
Pasquale Pascale
By May W. Johnson
Attorney

Patented Dec. 10, 1929

1,739,015

UNITED STATES PATENT OFFICE

PASQUALE PASCALE, OF NEW YORK, N. Y., ASSIGNOR TO DRI-STEAM VALVE CORPORATION, A CORPORATION OF DELAWARE

VALVE

Application filed August 28, 1926. Serial No. 132,281.

This invention relates to valves and has special reference to a valve for controlling fluids under pressure wherein pressure of the fluid within the valve casing may be caused to open and close the valve at the will of the operator.

In the operation of fluid pressure controlling valves, and especially those of considerable size, the movement of the valve proper off and on its seat by such mechanical means as a lever, screw or other of the usual mechanisms requires the expenditure of considerable force even in such cases as those in which attempts are made to balance the moving element of valve proper. This is due in part to the necessity of the operating mechanism being partly without and partly within the valve casing, the external elements being connected to the internal elements by means passing into the valve casing through a suitably packed opening, the packing producing much frictional resistance to the movement. Generally, however, this expenditure of force is due to the unbalanced condition of the valve.

It is important, in many cases, that such valves be operated with a maximum of ease and efficiency and a minimum exertion of external power and it is fully as important that the operating means for the valves should be of the simplest possible character and free from all complicated arrangements of parts.

The present invention contemplates the construction of a valve wherein the moving part will derive its motion, both in opening and in closing, wholly from the pressure of the fluid in the valve casing on the movable member or valve proper.

The principal objects of the invention include the provision of a novel and improved form of valve construction wherein the valve proper may have the fluid pressure within the valve casing so distributed that the pressure tending to move the valve towards its seat will be substantially balanced by pressure in the opposite direction, the valve being so constructed that an excess of pressure in each direction may be produced at the will of the operator, the provision of an extremely simple device for the purpose; and the production of a construction having its working parts so arranged as to require a minimum of repairs and replacements due to wear.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

In the construction of the valve as here shown there is provided a body or casing 10 having a top closed by a removable cover plate 11 bolted securely to the body. In this top there is provided an inlet port 12 so that fluid under pressure may enter the body, a pipe 13 leading from some suitable source of such fluid to the port 12.

Figure 1:
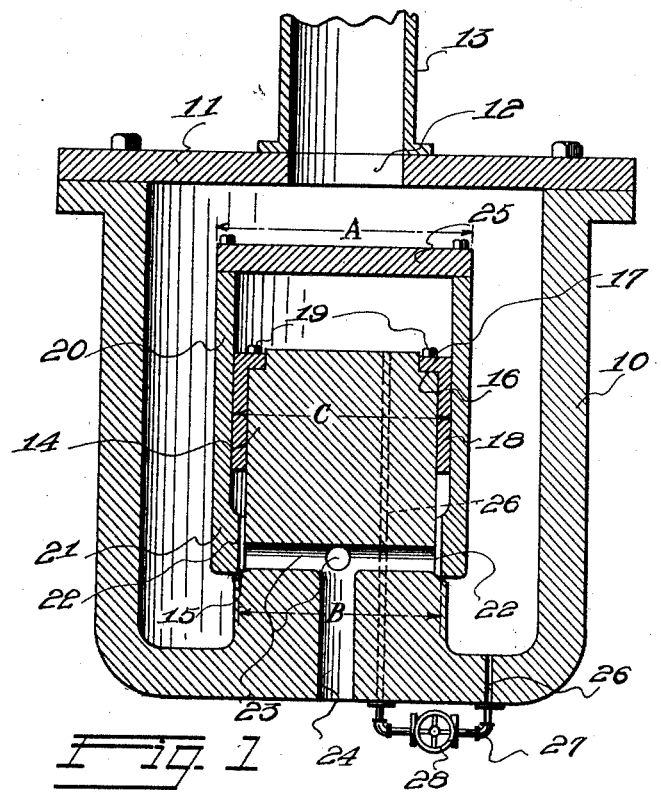
Figure 1 is a vertical median section through a valve constructed in accordance with this invention.
Figure 2:
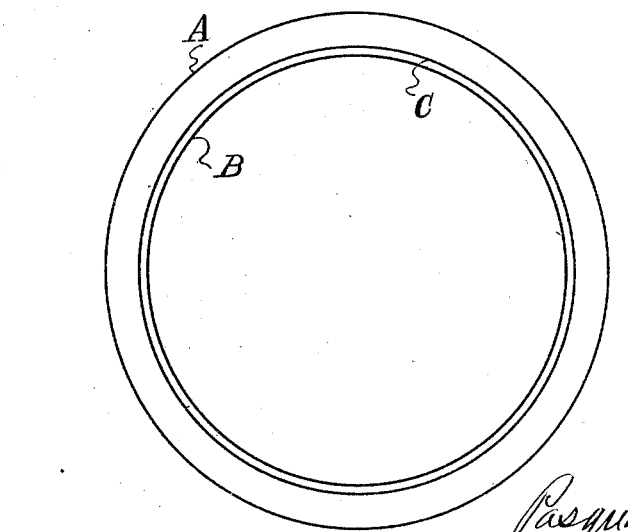
Figure 2 is a diagram contrasting the pressure areas tending to lift the valve from its seat and tending to seat the valve.

The bottom of the body carries an axially extending boss 14 circular in cross section. This boss may be formed integrally with the body or may be formed separately and secured thereto in any of the well known mechanical means of fastening parts together. The upper part of this boss is of less diameter than the lower part and the two parts are delimited by a beveled valve seat 15. The upper end of the boss is provided with a peripheral rabbet 16 wherein seats the internal flange 17 of a sleeve 18 fitting closely over the upper end of the boss and secured thereon by bolts 19. Slidably mounted on the sleeve 18 is a sleeve 20 having a broad internal flange 21 at its lower end fitting the smaller diameter of the boss 14 and having its inner and lower angle beveled to correspond with the bevel 15, thus forming a valve. One or more grooves 22 extend longitudinally of this flange 21 to vent the space between the lower end of the sleeve 18 and the top of the flange 21. Passages 23 extend radially from the outer surface of the boss above the valve seat to the center of the boss and these unite in an axial outlet passage 24. The grooves 22 communicate with the passages 23. The upper end of the sleeve 20 is closed by a head 25 firmly bolted to the sleeve. Thus the sleeve 18 forms a piston fitting in the open ended cylinder formed by the sleeve 20 and head 25 and constituting a cylinder valve. By-pass passage 26 is connected by a by-pass pipe 27 having a three way valve 28 therein. Thus fluid under pressure in the valve body may be admitted to the space above the piston or drawn off from this space and permitted to escape to the atmosphere. While these details form a part of the invention the essence thereof is by no means limited to such specific features and will now be particularized. It is to be observed that the diameter of the piston is slightly greater than the maximum diameter of the valve seat and this is most essential to the operation of the device so that these proportions must be maintained irrespective of the constructional details. Bearing this in mind and referring to Figure 2 suppose the circle A to have the same diameter as the head 25, the circle B to have the same diameter as the maximum diameter of the operative portion of the valve seat, and the circle C to have the same diameter as the piston. Then pressure in the body will produce downward pressure on the cylinder or sleeve valve proportional to the area within A and upward pressure proportional to the area between A and B so that the effective downward pressure will be represented by the area within B. If, now, the pressure be admitted on top of the piston through the by-pass then the effective upward pressure will be represented by the area within C and since this is greater than the area within B, the valve will rise and open. Obviously when pressure is reduced in the cylinder space above the piston the valve will close. It will be plain that the excess of the area within C may be made of such proportions as to properly overcome the weight of the cylinder valve and its friction on the piston.

It will be plain from the foregoing that the invention is of extreme simplicity and involves only two moving parts, the cylinder valve and the valve proper of the by-pass.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a valve, a casing, a boss fixed within said casing and having its free end constituting a piston, the boss being provided with a peripheral valve seat spaced from the free end and above the fixed end, said seat being of lesser outside diameter than the diameter of the piston, a cylinder fitting said piston and having one end closed and the remaining end formed to seat on the operative portion of the said valve seat, and means to admit fluid under pressure to the space in the cylinder above the piston.

2. In a valve, a casing, a boss fixed within said casing and having its free end constituting a piston, the boss being provided with a peripheral valve seat spaced from the free end and above the fixed end, said seat being of lesser outside diameter than the diameter of the piston, a cylinder fitting said piston and having one end closed and the remaining end formed to seat on the operative portion of the said valve seat, and a valved by-pass leading from the casing to the space within the cylinder.

3. In a valve, a casing having an inlet port at one end, a boss within the casing fixed to the end opposite the inlet port and having its free end constituting a piston, the boss being provided with a series of outlet passages extending inwardly from its periphery and uniting axially of the boss in a common outlet passage opening through the last mentioned end of the casing, the boss having a peripheral valve seat positioned between the last mentioned end of the casing and the inlet end of the outlet passages, the seat being of lesser outside diameter than the piston, a cylinder having one end closed and the remaining end formed to seat on the operative portion of the said valve seat, and manually controllable means to admit fluid under pressure to the space in the cylinder above the piston.

4. In a valve, a casing having an inlet port at one end, a boss within the casing fixed to the end opposite the inlet port and having its free end constituting a piston, the boss being provided with a series of outlet passages extending inwardly from its periphery and uniting axially of the boss in a common outlet passage opening through the last mentioned end of the casing, the boss having a peripheral valve seat positioned between the last mentioned end of the casing and the inlet end of the outlet passages, the seat being of lesser outside diameter than the piston, a cylinder having one end closed and the remaining end formed to seat on the operative portion of the said valve seat, and a valved by-pass leading from the casing to the space within the cylinder.

5. In a valve, a casing having an inlet port, a boss within the casing carried by one wall thereof, said boss having the end adjacent the wall of greater diameter than the free end and provided with a peripheral shoulder forming a valve seat between said ends, said boss having an outlet port opening at one end laterally through the free end adjacent the valve seat and opening at its other end through said wall, a sleeve of lesser external diameter than the external diameter of the valve seat and fixed on the free end of the boss whereby said free end constitutes a piston, a cylinder fitted slidably on said piston and having one end closed and the open end formed to seat on the operative portion of the said valve seat, and means to admit fluid under pressure to the space within the closed end of the cylinder.

6. In a valve, a casing having an inlet port, a boss within the casing carried by one wall thereof, said boss having the end adjacent the wall of greater diameter than the free end and provided with a peripheral shoulder forming a valve seat between said ends, said boss having an outlet port opening at one end laterally through the free end adjacent the valve seat and opening at its other end through said wall, a sleeve of lesser external diameter than the external diameter of the valve seat and fixed on the free end of the boss whereby said free end constitutes a piston, a cylinder fitted slidably on said piston and having one end closed and the open end formed to seat on the operative portion of the said valve seat, and a valved by-pass leading from the casing to the space within the cylinder.

In testimony whereof he affixes his signature.

PASQUALE PASCALE.